United States Patent [19]

Hirs

[11] Patent Number: 4,826,589

[45] Date of Patent: May 2, 1989

[54] BAR SCREEN FILTER

[76] Inventor: Gene Hirs, 6865 Meadowlake Dr., Birmingham, Mich. 48010

[21] Appl. No.: 214,033

[22] Filed: Jun. 30, 1988

[51] Int. Cl.⁴ .............................................. B01D 33/00
[52] U.S. Cl. .................................... 210/159; 210/162; 210/413
[58] Field of Search ............... 210/159, 162, 407, 413, 210/154; 209/387; 134/110

[56] References Cited

U.S. PATENT DOCUMENTS

| | | | |
|---|---|---|---|
| 3,093,580 | 6/1963 | Siewert | 210/159 |
| 3,209,913 | 10/1965 | Burgin | 210/154 |
| 4,184,957 | 1/1980 | Botsch | 210/155 |
| 4,392,952 | 7/1983 | Fechter et al. | 210/159 |
| 4,424,125 | 1/1984 | Martin | 210/104 |
| 4,447,323 | 5/1984 | Jackson | 210/158 |
| 4,521,306 | 6/1985 | Day | 210/159 |

Primary Examiner—Richard V. Fisher
Assistant Examiner—Matthew Savage
Attorney, Agent, or Firm—Lyman R. Lyon

[57] ABSTRACT

A bar screen filter comprises a plurality of bars arranged in closely spaced parallel relation so as to define slots through which liquid flows. A scraper element is disposed above the bar screen and has a plurality of free floating knife blades projecting downwardly through the slots between the said bars.

3 Claims, 2 Drawing Sheets

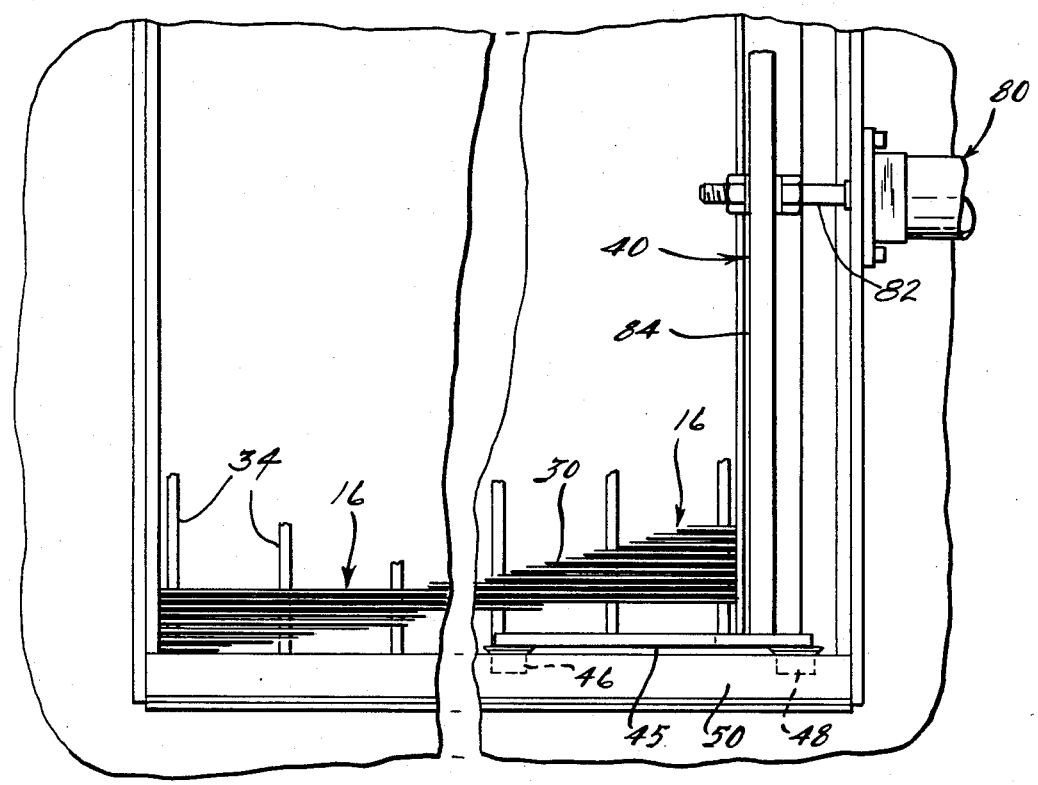
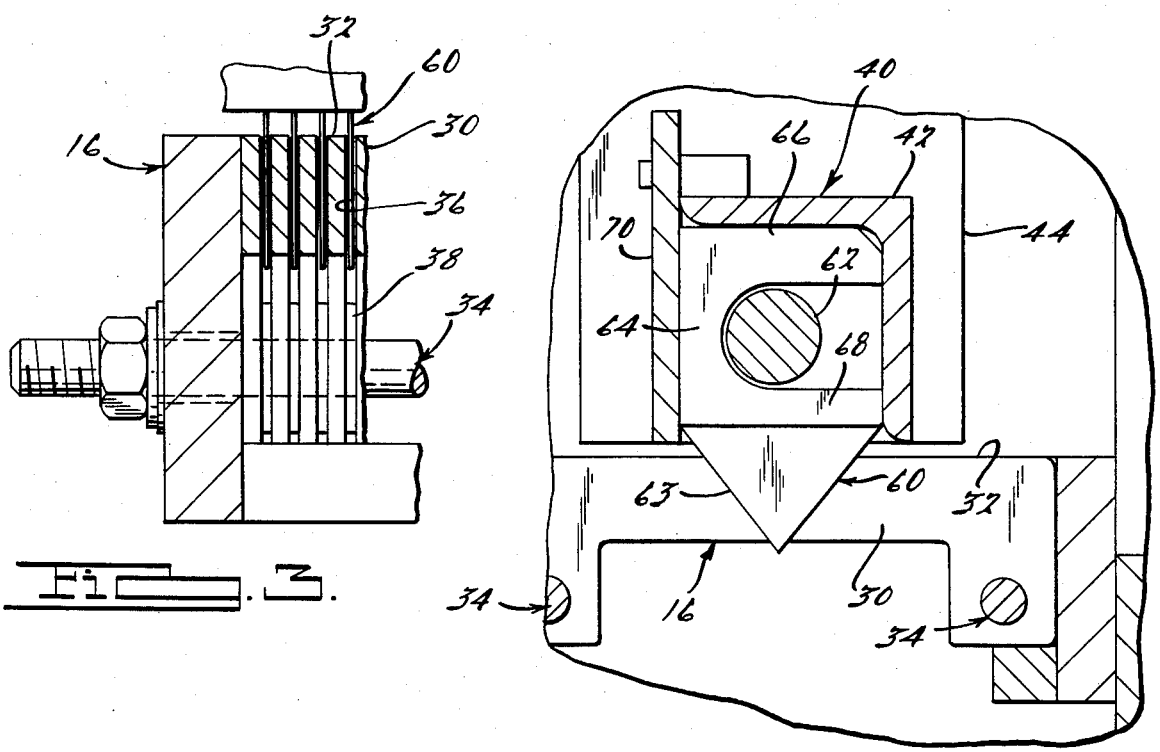

BAR SCREEN FILTER

BACKGROUND OF THE INVENTION

The instant invention relates to a bar screen filter for filtering of solid contaminants from a liquid.

Fixed bar screens comprised of a plurality of parallel, longitudinally extending, transversely spaced bars are known in the art. However, such bar screens generally employ relatively wide interbar spacing and are used only to separate sizeable contaminants from a liquid flowing therethrough. To effect removal of smaller contaminants, the prior art teaches the use of a secondary filter downstream from the bar screen.

For example, U.S. Pat. No. 4,392,952 to Fechter et al discloses a vertical bar screen filter where the cleaning mechanism is of the pivotal type that articulates at the bottom of a stroke.

U.S. Pat. No. 3,093,580 to Siewert teaches a bar screen consisting of a vertical screen which is stationary and a movable screen that moves laterally to remove particles from the fixed screen.

U.S. Pat. No. 4,424,125 Martin discloses a septum into which a traveling conveyer scrapes material. There is no teaching of rakes or knives that pass through the screen.

U.S. Pat. No. 4,184,957 to Botsch discloses a double screen. Rake arms are located on the upstream side of the filter. The bar screen may be inclined or vertically disposed.

U.S. Pat. No. 4,447,323 Jackson discloses a vertical or inclined bar screen with the cleaning mechanism on the upstream side. A watertight gutter carries a pan that carries debris into a trough.

The aforesaid patents all teach the use of relatively coarse spacing of the bars generally in the $\frac{1}{4}"$ to $\frac{1}{2}"$ range. All the rakes or cleaning mechanisms are fixed relative to one another. All of the bar screens are vertically disposed or slightly inclined from the vertical.

The bar screen filters taught in the aforesaid patents do not fully satisfy a requirement often found in industry, namely, that such filters screen out relatively fine particles, for example, particles in the 0.010" to 0.040" range. When closely spaced bars are used, the manufacturing tolerance of the bars comes into play. Such fine slots must be cleaned without the cleaning blades encountering interference with the bars due to tolerance stackup, bending, warpage, or other forms of bar distortion.

Another desirable feature of a bar screen filter is that the bar screen be orientated horizontally and that fluid flow be upward therethrough so that debris falls cleanly away from the bars by gravity.

Yet another desirable feature is that the screen cleaning knives be orientated on the downstream side of the bar screen so as to prevent the accumulation of foreign material on the scraper mechanism.

Accordingly, there is a need for a practical bar screen filter that utilizes relatively closely spaced bars, an efficient scraping mechanism utilizing floating knives, or rakes, and an orientation that augments filter efficiency.

SUMMARY OF THE INVENTION

The bar screen filter of the instant invention features easily replaced screen cleaner knives that float on a support assembly so as to freely adjust to the screen slots. The bar screen is orientated generally horizontally to facilitate gravity separation of sludge and also to produce a uniform head on the entire area of the filter.

More specifically, the bar screen filter of the instant invention comprises a plurality of bars arranged in closely spaced parallel relation with the upper surfaces thereof being coplanar. A scraper assembly extends transversely of the bars on the downstream side thereof. The scraper assembly is periodically moved longitudinally of the bars. Sludge accumulated between the bars due to upflow of contaminated fluid is scraped therefrom for gravity settling to the bottom of the filter tank.

The scraper assembly is provided with a plurality of knife blades that project downwardly within the slots between the bars of the bar screen. The knife blades are free to float laterally of the bars to accommodate manufacturing tolerance deviations, and wear, distortion, etc.

BRIEF DESCRIPTION OF THE DRAWINGS

FIG. 2 is a view taken in the direction of the arrow "2" of FIG. 1.

FIG. 3 is a cross-sectional view taken along the line 3—3 of FIG. 1.

FIG. 4 is an enlarged view taken within the circle "4" of FIG. 1.

DETAILED DESCRIPTION OF THE PREFERRED EMBODIMENT OF THE INVENTION

Figure 1:
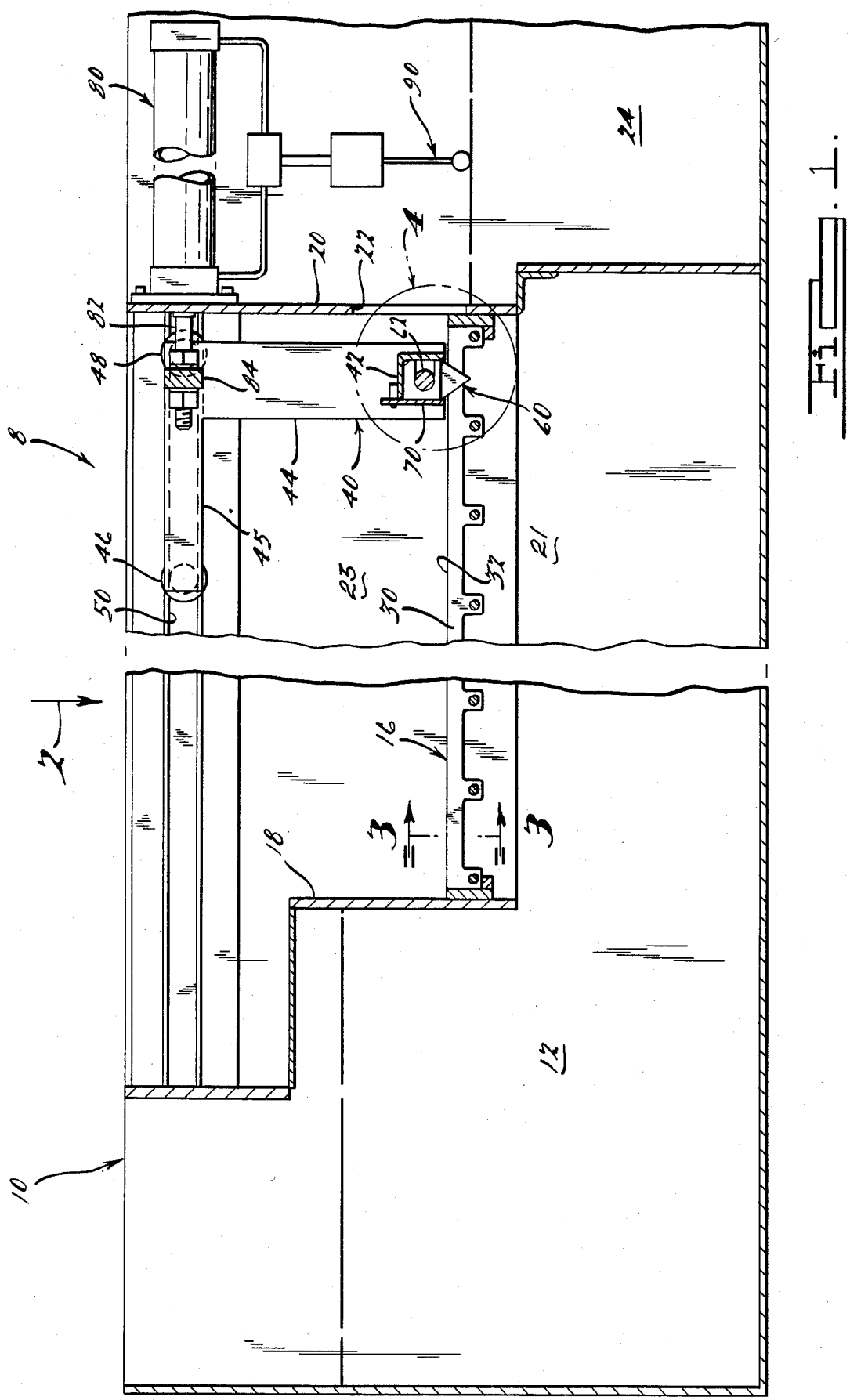
FIG. 1 is a vertical sectional view of a preferred embodiment of the bar screen filter of the instant invention.

For illustrative purposes, a bar screen filter 8 of the instant invention will be described in the context of an industrial parts washer 10 wherein the filter 8 is utilized to remove contaminants from washer fluid recirculating therein.

Referring to FIG. 1, the industrial parts washer 10 comprises a tank 12 wherein contaminated washer fluid is collected from the parts washing operation. In a constructed embodiment, a bar screen 16 extends horizontally between walls 18 and 20 of the tank 12 to define an upstream side 21 and a downstream side 23 in the tank 12. An aperture 22 in the wall 20 of the tank 12 permits flow of fluid from the downstream side 23 of the bar screen 16 to a clean fluid reservoir 24.

As best seen in FIG. 2, the bar screen 16 comprises a plurality of bars 30 stamped from, for example, stainless steel, that are rigidly mounted in close-spaced parallel relation with the upper surfaces 32 thereof in coplanar alignment by a plurality of retainer rods 34. The bars 30 define a plurality of slots 36 of, for example, 0.030 to 0.040 inches in width, as dictated by the thickness of a like plurality of spacer washers 38. Washer fluid flows upwardly through the slots 36 due to static fluid head between the tank 12 and clean fluid reservoir 24. During such fluid flow, contaminants accrete below and within the slots 36 between opposed side walls of adjacent bars 30. The filtrate thereafter flows through the aperture 22 to tank 24.

In accordance with one feature of the instant invention, a scraper assembly 40 comprises a bar 42 of L-shaped cross section which is carried by a pair of downwardly extending arms 44, one of which is shown, on a pair of scraper carriages 45. The carriages are supported on rollers 46 and 48 which run in tracks 50 on opposite sides of the tank 12.

A plurality of knife blades 60 are loosely supported by a transverse rod 62 so as to project within the slots 36 between each of the bars 30. The knife blades 60 are of downwardly pointed configuration whereby a leading edge 63 thereof directs contaminant accretion within the slots 36 downwardly so as to drop by gravity to the bottom of the tank 12. The tip of each knife blade 60 extends downwardly entirely through the slot 36 in which it resides. An upper portion of the knives 60 is of horizontally opening U-shaped configuration defined by a bight portion 64 and spaced leg portions 66 and 68 so as to be capable of assembly into the generally rectangular cross section of the scraper assembly 40 defined by the bar 42 in conjunction with a closure plate 70. The closure plate 70 provides access to the knife support rod 62 for knife replacement and retains the knives 60 in operative position thereon.

Longitudinal displacement of the scraper assembly 40 is achieved by actuation of an air cylinder 80, a rod 82 being attached to the legs 44 of the scraper assembly 40 through a transverse bar 84.

In operation, as fluid flows from the upstream side 21 upwardly through the bar screen 16 due to static head becomes inhibited due to contaminant accretion in the slots 36 thereof, the level of cleansed fluid within the filtered fluid reservoir 24 will lower. When the filtered fluid reaches a predetermined level, as measured by a float sensor 90, a control circuit (not shown) is energized to actuate the air cylinder 80. Upon actuation of the cylinder 80, the scraper assembly 40 moves longitudinally of the bars 30, to the left as seen in FIG. 1, whereby contaminant that has accreted within the slots 36 is scraped therefrom by the knife blades 60.

It is important to note that the knives 60 are supported for translation parallel to the base 30 yet are free to move laterally thereof to accommodate bar deformation.

While the preferred embodiment of the invention has been disclosed, it should be appreciated that the invention is susceptible of modification without departing from the scope of the following claims.

I claim:
1. A filter comprising
   a liquid container,
   a plurality of generally horizontallyt orientated bars arranged in closed spaced parallel relation so as to define a bar screen having slots through which liquid flows,
   means defining discrete liquid chambers communicating with opposite sides of said bar screen, respectively,
   a scraper element above and on a downstream side of said bar screen extending laterally of the slots in said bar screen, said scraper element including a plurality of lateally movable knife blades projecting downwardly through the slots between the said bars to an upstream side thereof, and
   means on the downstream side of said bar screen for displacing said scraper element longitudinally of said bars whereby contaminants accreted within said slots are scraped therefrom by said knift blades for free fall by gravity to the bottom of the liquid chamber communicating with the upstream side of said bar screen.
2. A filter in accordance with claim 1 wherein said scraper element comprises
   a knife support rod extending laterally of said bars, said knife blades having a U-shaped cutout therein for acceptance on said support rod.
3. A filter in accordance with claim 2 wherein said knives are removably retained on said knife support rod to facilitate knife replacement.

* * * * *